(12) United States Patent
Sahara et al.

(10) Patent No.: US 11,307,336 B2
(45) Date of Patent: Apr. 19, 2022

(54) GLASS PLATE WITH DIELECTRIC MULTILAYER FILM AND MANUFACTURING METHOD THEREOF

(71) Applicant: NIPPON ELECTRIC GLASS CO., LTD., Shiga (JP)

(72) Inventors: Keiichi Sahara, Otsu (JP); Tsutomu Imamura, Otsu (JP); Yasutaka Tanabe, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 224 days.

(21) Appl. No.: 16/468,673

(22) PCT Filed: Dec. 11, 2017

(86) PCT No.: PCT/JP2017/044378
§ 371 (c)(1),
(2) Date: Jun. 11, 2019

(87) PCT Pub. No.: WO2018/110499
PCT Pub. Date: Jun. 21, 2018

(65) Prior Publication Data
US 2019/0346603 A1     Nov. 14, 2019

(30) Foreign Application Priority Data
Dec. 15, 2016    (JP) .............................. JP2016-243109

(51) Int. Cl.
*G02B 5/28*     (2006.01)
*B32B 7/025*     (2019.01)
(Continued)

(52) U.S. Cl.
CPC ................ *G02B 5/28* (2013.01); *B32B 7/025* (2019.01); *G02B 5/26* (2013.01); *B32B 17/10036* (2013.01)

(58) Field of Classification Search
CPC . G02B 5/281–5/286; Y10T 428/24777; C03C 17/00–17/44; C03C 19/00
See application file for complete search history.

(56) References Cited

U.S. PATENT DOCUMENTS

| 4,261,645 A | * | 4/1981 | Sawamura | .......... C03C 17/3417 |
| | | | | 359/586 |
| 8,437,097 B2 | * | 5/2013 | Yamamoto | ............. G02B 5/282 |
| | | | | 359/885 |
| 2015/0369980 A1 | * | 12/2015 | Ockenfuss | ........ H01L 27/14685 |
| | | | | 250/208.1 |

FOREIGN PATENT DOCUMENTS

| JP | 2002362943 A | 12/2002 |
| JP | 2013252992 A | 12/2013 |

(Continued)

OTHER PUBLICATIONS

Machine translation of JP2002-362943. Retrieved Mar. 18, 2021.*
Chinese Office Action dated May 25, 2021, Chinese Patent Application No. 201780076530.6.

*Primary Examiner* — Prashant J Khatri
(74) *Attorney, Agent, or Firm* — Proskauer Rose LLP

(57) ABSTRACT

A dielectric multilayer film-incorporated glass plate is disclosed that includes a glass plate and a dielectric multilayer film. The glass plate includes a corner surface located between at least one main surface and a side surface. The dielectric multilayer film includes a main surface covering portion that covers the main surface of the glass plate and a corner surface covering portion that covers the corner surface of the glass plate.

5 Claims, 3 Drawing Sheets

(51) Int. Cl.
   *G02B 5/26*    (2006.01)
   *B32B 17/10*   (2006.01)

(56) References Cited

FOREIGN PATENT DOCUMENTS

JP   2015121512 A    7/2015
WO   2014104009 A1   7/2014

* cited by examiner

GLASS PLATE WITH DIELECTRIC MULTILAYER FILM AND MANUFACTURING METHOD THEREOF

TECHNICAL FIELD

The present invention relates to a dielectric multilayer film-incorporated glass plate and a method for manufacturing the dielectric multilayer film-incorporated glass plate.

BACKGROUND

A dielectric multilayer film of a dielectric multilayer film-incorporated glass plate has a structure in which high refractive index films and low refractive index films having a lower refractive index than the high refractive index films are alternately laminated. Thus, for example, the glass plate functions to reduce reflection. Patent document 1 describes a dielectric multilayer film-incorporated glass plate including a corner surface located between a main surface and a side surface. Part of the corner surface of the dielectric multilayer film-incorporated glass plate is formed of dielectric multilayer films.

PRIOR ART LITERATURE

Patent Literature

Patent Document 1: Japanese Laid-Open Patent Publication No. 2013-252992

SUMMARY OF THE INVENTION

Problem to be Solved by the Invention

In the dielectric multilayer film-incorporated glass plate of patent document 1, an end of the glass plate is formed by an etched surface that exposes glass. When the dielectric multilayer film-incorporated glass plate is used as, for example, a cover member for a monitor, the glass plate may be coupled to a case or a frame in a state in which at least part of the corner surface is exposed at the end of the glass plate. When the dielectric multilayer film-incorporated glass plate is used in a state in which the corner surface of the glass plate is exposed, the dielectric multilayer film may not function properly at the corner surface. Thus, the dielectric multilayer film-incorporated glass plate may not function sufficiently.

The present invention is made in view of such circumstances, and its objective is to provide a dielectric multilayer film-incorporated glass plate and a method for manufacturing the dielectric multilayer film-incorporated glass plate that allow the dielectric multilayer film to function in a preferred manner when used with a glass plate including a corner surface.

Means For Solving the Problem

A dielectric multilayer film-incorporated glass plate that solves the above problem includes a glass plate and a dielectric multilayer film. The glass plate includes a corner surface located between at least one main surface and a side surface. The dielectric multilayer film includes a main surface covering portion that covers the main surface of the glass plate and a corner surface covering portion that covers the corner surface of the glass plate.

In the dielectric multilayer film-incorporated glass plate, it is preferred that the main surface covering portion have an average reflectance of less than or equal to 2.0% in a visible spectrum at a wavelength greater than or equal to 400 nm and less than or equal to 780 nm. Further, it is preferred that when the average reflectance of the main surface covering portion in the visible spectrum corresponds to a relative value of 100, the corner surface covering portion have an average reflectance of less than or equal to a relative value of 1500 in the visible spectrum.

In the dielectric multilayer film-incorporated glass plate, it is preferred that the main surface covering portion have an average reflectance of greater than or equal to 70% in an infrared spectrum at a wavelength greater than or equal to 950 nm and less than or equal to 1100 nm.

In the dielectric multilayer film-incorporated glass plate, it is preferred that the main surface covering portion and the corner surface covering portion of the dielectric multilayer film be formed continuously and homogeneously by a plurality of layers. Further, it is preferred that when the main surface covering portion has a thickness corresponding to a relative value of 100, the corner surface covering portion have a thickness of greater than or equal to a relative value of 50 and less than or equal to a relative value of 95.

It is preferred that the dielectric multilayer film-incorporated glass plate be used as a cover member coupled in a state in which at least part of the corner surface covering portion is exposed.

A method for manufacturing the dielectric multilayer film-incorporated glass plate preferably includes obtaining the glass plate by forming the corner surface on a glass sheet and arranging the dielectric multilayer film on the main surface of the glass plate and the corner surface of the glass plate.

Effect of the Invention

In accordance with the present invention, the dielectric multilayer film functions in a preferred manner when used with the glass plate including the corner surface.

MODE FOR CARRYING OUT THE INVENTION

Figure 1:
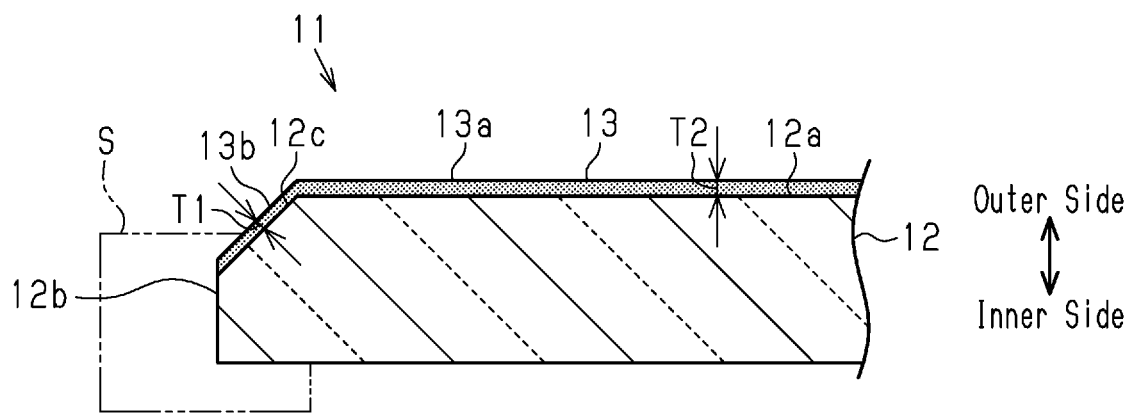
FIG. 1 is a schematic cross-sectional view of a dielectric multilayer film-incorporated glass plate in accordance with one embodiment.

A dielectric multilayer film-incorporated glass plate and a method for manufacturing the dielectric multilayer film-incorporated glass plate will now be described with reference to the drawings. In the drawings, elements are illustrated for simplicity and clarity and have not necessarily been drawn to scale.

Figure 2:
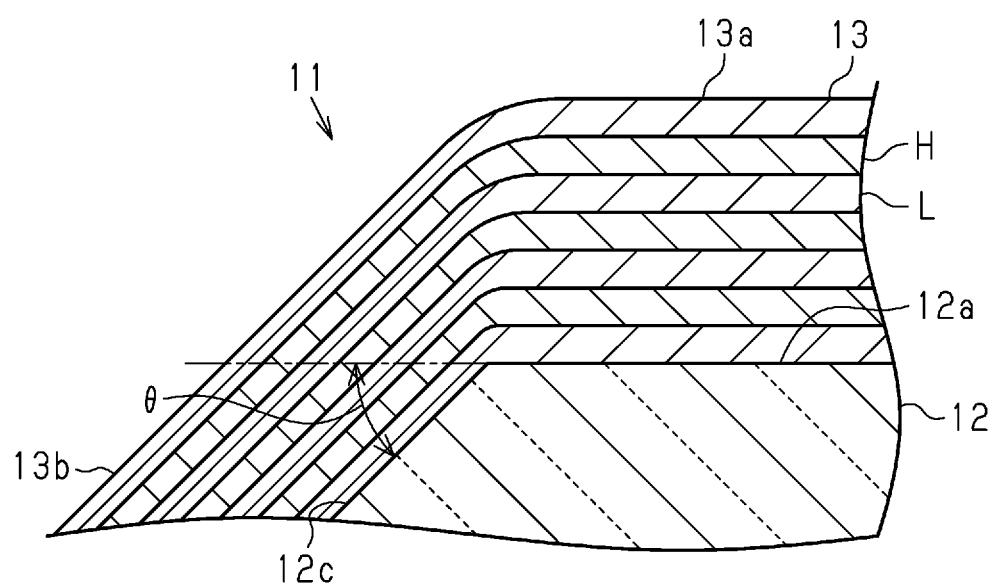
FIG. 2 is a partially enlarged cross-sectional view of the dielectric multilayer film-incorporated glass plate.

As shown in FIGS. 1 and 2, a dielectric multilayer film-incorporated glass plate 11 includes a glass plate 12 and a dielectric multilayer film 13. The glass plate 12 includes a main surface 12a, a side surface 12b, and a corner surface 12c located between the main surface 12a and the side surface 12b. That is, the corner surface 12c connects the main surface 12a and the side surface 12b. Preferably, the inclination angle of the corner surface 12c of the glass plate 12 relative to the main surface 12a, namely, the chamfer angle θ, is in a range of greater than or equal to 20° and less than or equal to 70°. In the present embodiment, the inclination angle of the corner surface 12c of the glass plate 12 relative to the main surface 12a, or the chamfer angle θ, is 45°. Examples of the glass forming the glass plate 12 include silicate glass, borate glass, borosilicate glass, phosphate glass, and borophosphate glass. The glass plate 12 has a thickness, for example, in a range of 0.1 to 5 mm.

The dielectric multilayer film 13 functions, for example, to reduce reflection of visible light and increase reflection of infrared light. The dielectric multilayer film 13 includes a main surface covering portion 13a that covers the main surface 12a of the glass plate 12 and a corner surface covering portion 13b that covers the corner surface 12c of the glass plate 12. The dielectric multilayer film 13 is constructed by alternately laminating high refractive index films H and low refractive index films L, which have a lower refractive index than the high refractive index films H. The high refractive index films H include, for example, at least one selected from niobium oxide, titanium oxide, tantalum oxide, lanthanum oxide, tungsten oxide, and zirconium oxide. Preferably, the high refractive index films H include niobium oxide. The low refractive index films L include, for example, at least one selected from silicon oxide and aluminum oxide. Preferably, the low refractive index films L include silicon oxide.

In the dielectric multilayer film 13, the total number of laminated layers of the high refractive index films H and the low refractive index films L is, for example, greater than or equal to 4 and less than or equal to 60. The dielectric multilayer film 13 may include a gradual transition layer in which the refractive index gradually decreases or increases from a high refractive index film H toward a low refractive index film L between the high refractive index film H and the low refractive index film L. Further, a gradual transition layer in which the refractive index gradually decreases or increases from a dielectric multilayer film 13 toward the glass plate 12 may be arranged between the glass plate 12 and the dielectric multilayer film 13. In addition to the high refractive index films H and the low refractive index films L, an intermediate refractive index film may be used having an refractive index that is smaller than the high refractive index films H and greater than the low refractive index films L.

The main surface covering portion 13a and the corner surface covering portion 13b of the dielectric multilayer film 13 of the present embodiment are formed continuously and homogeneously by a plurality of layers. In order to limit delamination of the corner surface covering portion 13b, when the main surface covering portion 13a has a thickness T2 corresponding to a relative value of 100, the corner surface covering portion 13b has a thickness T1 that is preferably less than or equal to a relative value of 95 and further preferably less than or equal to a relative value of 85. In order to bring optical characteristics of the main surface covering portion 13a and the corner surface covering portion 13b closer to each other, when the thickness T2 of the main surface covering portion 13a corresponds to a relative value of 100, the thickness T1 of the corner surface covering portion 13b is preferably greater than or equal to 50, further preferably greater than or equal to 60, and more preferably greater than or equal to 65.

Preferably, the main surface covering portion 13a of the dielectric multilayer film 13 has an average reflectance of less than or equal to 2.0% in the visible spectrum at a wavelength greater than or equal to 400 nm and less than or equal to 780 nm.

In order to reduce reflection of visible light at the corner surface covering portion 13b, when the average reflectance of the main surface covering portion 13a in the above visible spectrum corresponds to a relative value of 100, the average reflectance of the corner surface covering portion 13b of the dielectric multilayer film 13 in the above visible spectrum is preferably less than or equal to a relative value of 1500 and further preferably less than or equal to a relative value of 1000.

In order to increase reflection of infrared light at the main surface covering portion 13a, it is preferred that the main surface covering portion 13a of the dielectric multilayer film 13 have an average reflectance of greater than or equal to 70% in the infrared spectrum at a wavelength greater than or equal to 950 nm and less than or equal to 1100 nm. This reduces adverse effects (e.g., thermal effects) that would be caused by the transmission of infrared light.

In order to increase reflection of infrared light at the corner surface covering portion 13b, when the average reflectance of the main surface covering portion 13a in the above infrared spectrum corresponds to a relative value of 100, the average reflectance of the corner surface covering portion 13b of the dielectric multilayer film 13 in the above infrared spectrum is preferably greater than or equal to a relative value of 70.

The above average reflectance can be obtained as described below. The dielectric multilayer film-incorporated glass plate 11 includes a reflectance measurement surface and an opposite surface (rear surface) that is sandblasted. The blasted surface is then black-painted to eliminate reflection. A spectrophotometer (e.g., U4100, manufactured by Hitachi, Ltd.) is used to measure the spectral reflectance (angle of incident of 5°) of the dielectric multilayer film-incorporated glass plate 11, which has been processed as described above, in a predetermined wavelength range (measurement wavelength interval of 1 nm). The average reflectance is obtained by calculating the average value of the reflectance at each wavelength. Further, the reflectance of the corner surface covering portion 13b is a value measured when the angle of incidence is equal to (chamfer angle θ-5)°, which is obtained by subtracting 5° from the chamfer angle θ.

A method for manufacturing the dielectric multilayer film-incorporated glass plate 11 will now be described.

The method for manufacturing the dielectric multilayer film-incorporated glass plate 11 includes a step of obtaining the glass plate 12 by forming the corner surface 12c on a glass sheet and a step of arranging the dielectric multilayer film 13 on the main surface 12a of the glass plate 12 and the corner surface 12c of the glass plate 12. The glass material prepared in the step of obtaining the glass plate 12 is obtained by cutting a mother glass into pieces having predetermined dimensions. In the step of obtaining the glass plate 12, the corner surface 12c of the glass plate 12 can be formed by grinding the end surface of the glass sheet.

In the step of arranging the dielectric multilayer film 13 of the method for manufacturing the dielectric multilayer film-incorporated glass plate 11, layers of the dielectric multilayer film 13 are sequentially formed on the main surface 12a of the glass plate 12 and the corner surface 12c of the glass plate 12 through a known film formation process. The film formation process of the dielectric multilayer film 13 includes, for example, sputtering, vacuum vapor deposition, ion beam deposition, ion-plating, and CVD. Among these film formation processes, sputtering is preferred since the thickness of each layer can be controlled with high accuracy and the obtained dielectric multilayer film 13 has a stable quality.

In the sputtering process, for example, a resist plate (also referred to as deposition resist plate, shield, and the like) may be used to change the thickness T1 of the corner surface covering portion 13b relative to the thickness T2 of the main surface covering portion 13a. More specifically, the thickness T1 of the corner surface covering portion 13b can be changed by adjusting the relative heights of the resist plate, which is frame-shaped and arranged along the periphery of the glass plate 12, and the main surface 12a of the glass plate 12. That is, as the height of the resist plate relative to the main surface 12a of the glass plate 12 decreases, the thickness T1 of the corner surface covering portion 13b increases. More specifically, when the thickness T2 of the main surface covering portion 13a corresponds to a relative value of 100, the thickness T1 of the corner surface covering portion 13b can be greater than or equal to a relative value of 50 by setting the main surface of the resist plate at a lower height than the main surface 12a of the glass plate 12.

The application of the dielectric multilayer film-incorporated glass plate 11 will now be described.

The dielectric multilayer film-incorporated glass plate 11 is used in a preferred manner as a cover member coupled in a state in which at least part of the corner surface covering portion 13b is exposed. More specifically, the dielectric multilayer film-incorporated glass plate 11 may be used as a cover member by supporting its end with a support S as shown by the double-dashed lines in FIG. 1. The dielectric multilayer film-incorporated glass plate 11 (cover member) is arranged so that the side of the main surface 12a (side of dielectric multilayer film 13) of the glass plate 12 is located at an outer side to protect components (e.g., electronic components) in a housing (not shown). The cover member is, for example, used with a monitor or a display.

Experimental examples of the dielectric multilayer film-incorporated glass plate 11 will now be described.

EXPERIMENTAL EXAMPLE 1

The dielectric multilayer film 13 was formed through sputtering on the glass plate 12 (soda lime glass plate, thickness of 2.5 mm, chamfer angle θ of corner surface 12c=45°). A load-lock type sputtering device was used to form the dielectric multilayer film 13. When forming of the dielectric multilayer film 13, sputtering was performed giving priority for the deposition of particles of a film formation material to the main surface 12a of the glass plate 12 over the corner surface 12c of the glass plate 12. In this way, when the thickness T2 of the main surface covering portion 13a corresponds to a relative value of 100, the thickness T1 of the corner surface covering portion 13b in each of the obtained dielectric multilayer film-incorporated glass plates 11 was equal to a relative value of 70, 80, or 90. Table 1 shows the thickness of each layer in the dielectric multilayer film 13 of the dielectric multilayer film-incorporated glass plate 11 of experimental example 1 at the main surface covering portion 13a. The dielectric multilayer film 13 of experimental example 1 had a laminated structure with a total of seven layers with the first layer being closest to the glass plate 12. The first layer was used as an anchor layer that increases adhesion between the glass plate 12 and the second layer.

TABLE 1

| | Material | Thickness of Main surface covering portion (nm) |
|---|---|---|
| 1st Layer | $SiO_2$ | 38.29 |
| 2nd Layer | $Nb_2O_5$ | 103.56 |
| 3rd Layer | $SiO_2$ | 171.06 |
| 4th Layer | $Nb_2O_5$ | 98.5 |
| 5th Layer | $SiO_2$ | 169.48 |
| 6th Layer | $Nb_2O_5$ | 101.86 |
| 7th Layer | $SiO_2$ | 82.91 |

Figure 3:
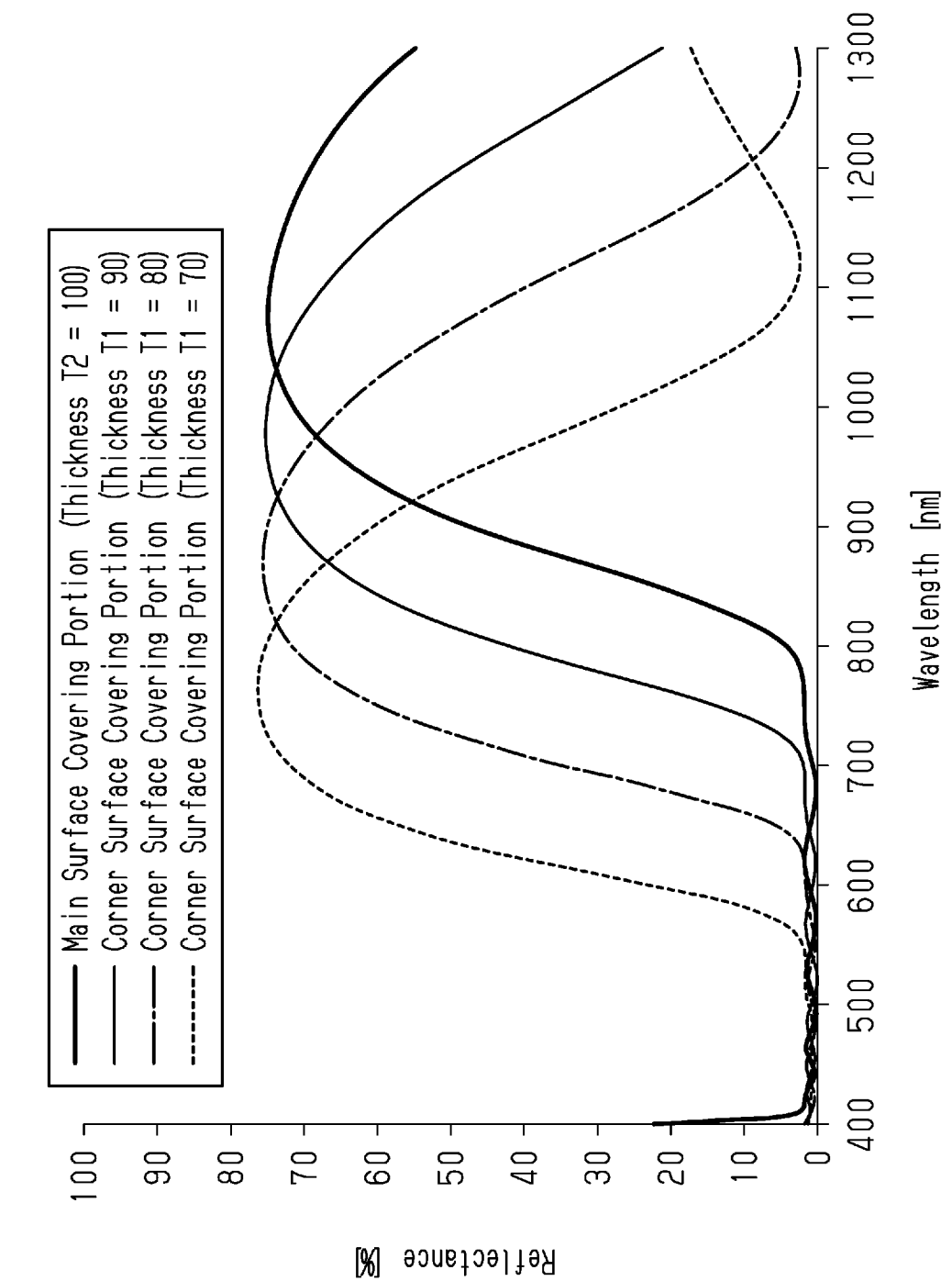
FIG. 3 is a graph showing the relationship of wavelength and reflectance of light emitted toward a dielectric multilayer film-incorporated glass plate of experimental example 1.

FIG. 3 is a graph showing the relationship of wavelength and reflectance of light emitted toward the dielectric multilayer film-incorporated glass plate 11 of experimental example 1.

As shown in FIG. 3, in the dielectric multilayer film-incorporated glass plate 11 having the thickness T1 of the corner surface covering portion 13b of a relative value of 70, the reflectance of the corner surface covering portion 13b starts increasing at the wavelength of around 550 nm. In the dielectric multilayer film-incorporated glass plate 11 having the thickness T1 of the corner surface covering portion 13b of a relative value of 80, the reflectance of the corner surface covering portion 13b starts increasing at the wavelength of around 630 nm. In the dielectric multilayer film-incorporated glass plate 11 having the thickness T1 of the corner surface covering portion 13b of a relative value of 90, the reflectance of the corner surface covering portion 13b starts increasing at the wavelength of around 700 nm. This indicates that as the thickness T1 of the corner surface covering portion 13b decreases, the local maximum value (peak) of the reflectance of the main surface covering portion 13a shifts toward the side of shorter wavelength.

An increase in the thickness of the dielectric multilayer film 13 reduces reflection of light with a longer wavelength in the visible spectrum. That is, for example, as the thickness of the dielectric multilayer film 13 increases, the reflectance of visible light starts increasing at a longer wavelength. Further, for example, as the thickness of the dielectric multilayer film 13 increases, the reflection in the infrared spectrum increases.

In the dielectric multilayer film 13 having a structure of seven layers as described above, the thickness of the dielectric multilayer film 13 is set, for example, in a range of greater than or equal to 760 nm and less than or equal to 880 nm to reduce the reflection of visible light and increase the reflection of infrared light.

In the dielectric multilayer film-incorporated glass plate 11 of experimental example 1, the average reflectance of the main surface covering portion 13a in the visible spectrum was 1.17%. Further, in a case where the thickness T2 of the main surface covering portion 13a corresponds to a relative value of 100, the average reflectance of the corner surface covering portion 13b in the visible spectrum was 32.03% when the thickness T1 of the corner surface covering portion 13b was equal to a relative value of 70, 15.11% when the thickness T1 was equal to a relative value of 80, and 3.45% when the thickness T1 was equal to a relative value of 90.

In the dielectric multilayer film-incorporated glass plate 11 of experimental example 1, the average reflectance of the main surface covering portion 13a in the infrared spectrum was 72.10%. Further, the average reflectance of the corner surface covering portion 13b in infrared spectrum was 20.24% when the thickness T1 was equal to a relative value of 70, 58.27% when the thickness T1 was equal to a relative value of 80, and 73.12% when the thickness T1 was equal to a relative value of 90.

EXPERIMENTAL EXAMPLE 2

In experimental example 2, the dielectric multilayer film-incorporated glass plates 11 were obtained in the same manner as experimental example 1 except in that the structure of the dielectric multilayer film 13 was changed. In experimental example 2, when the thickness T2 of the main surface covering portion 13a corresponds to a relative value of 100, five types of the dielectric multilayer film-incorporated glass plates 11 were obtained each of which has the thickness T1 of the corner surface covering portion 13b equal to a relative value of 60, 65, 70, 80, or 90. Table 2 shows the thickness of each layer in the dielectric multilayer film 13 of the dielectric multilayer film-incorporated glass plate 11 of experimental example 2 at the main surface covering portion 13a. The dielectric multilayer film 13 of experimental example 2 had a laminated structure with a total of nineteen layers with the first layer being closest to the glass plate 12. The first layer was used as an anchor layer that increases adhesion between the glass plate 12 and the second layer.

TABLE 2

| | Material | Thickness of Main surface covering portion (nm) |
|---|---|---|
| 1st Layer | $SiO_2$ | 30 |
| 2nd Layer | $Nb_2O_5$ | 1.63 |
| 3rd Layer | $SiO_2$ | 39.77 |
| 4th Layer | $Nb_2O_5$ | 20.92 |
| 5th Layer | $SiO_2$ | 15.23 |
| 6th Layer | $Nb_2O_5$ | 49.99 |
| 7th Layer | $SiO_2$ | 4.14 |
| 8th Layer | $Nb_2O_5$ | 39.43 |
| 9th Layer | $SiO_2$ | 30.98 |
| 10th Layer | $Nb_2O_5$ | 11.33 |
| 11th Layer | $SiO_2$ | 90.18 |
| 12th Layer | $Nb_2O_5$ | 2.65 |
| 13th Layer | $SiO_2$ | 53.98 |
| 14th Layer | $Nb_2O_5$ | 23.03 |
| 15th Layer | $SiO_2$ | 6.9 |
| 16th Layer | $Nb_2O_5$ | 77.76 |
| 17th Layer | $SiO_2$ | 4.28 |
| 18th Layer | $Nb_2O_5$ | 19.69 |
| 19th Layer | $SiO_2$ | 99.41 |

In the dielectric multilayer film-incorporated glass plates 11 of experimental example 2, the average reflectance of the main surface covering portion 13a in the visible spectrum was 0.93%. Further, the average reflectance of the corner surface covering portion 13b in the visible spectrum was 2.4% when the thickness T1 was equal to a relative value of 60, 1.09% when the thickness T1 was equal to a relative value of 65, 0.88% when the thickness T1 was equal to a relative value of 70, 0.92% when the thickness T1 was equal to a relative value of 80, and 0.92% when the thickness T1 was equal to a relative value of 90.

In the dielectric multilayer film-incorporated glass plates 11 of experimental example 2, the average reflectance of the main surface covering portion 13a in the infrared spectrum at the wavelength of 950 to 1100 nm was 0.77%. Further, the average reflectance of the corner surface covering portion 13b in the infrared spectrum was 36.86% when the thickness T1 was equal to a relative value of 60, 35.06% when the thickness T1 was equal to a relative value of 65, 29.65% when the thickness T1 was equal to a relative value of 70, 13.01% when the thickness T1 was equal to a relative value of 80, and 2.18% when the thickness T1 was equal to a relative value of 90.

Figure 4:
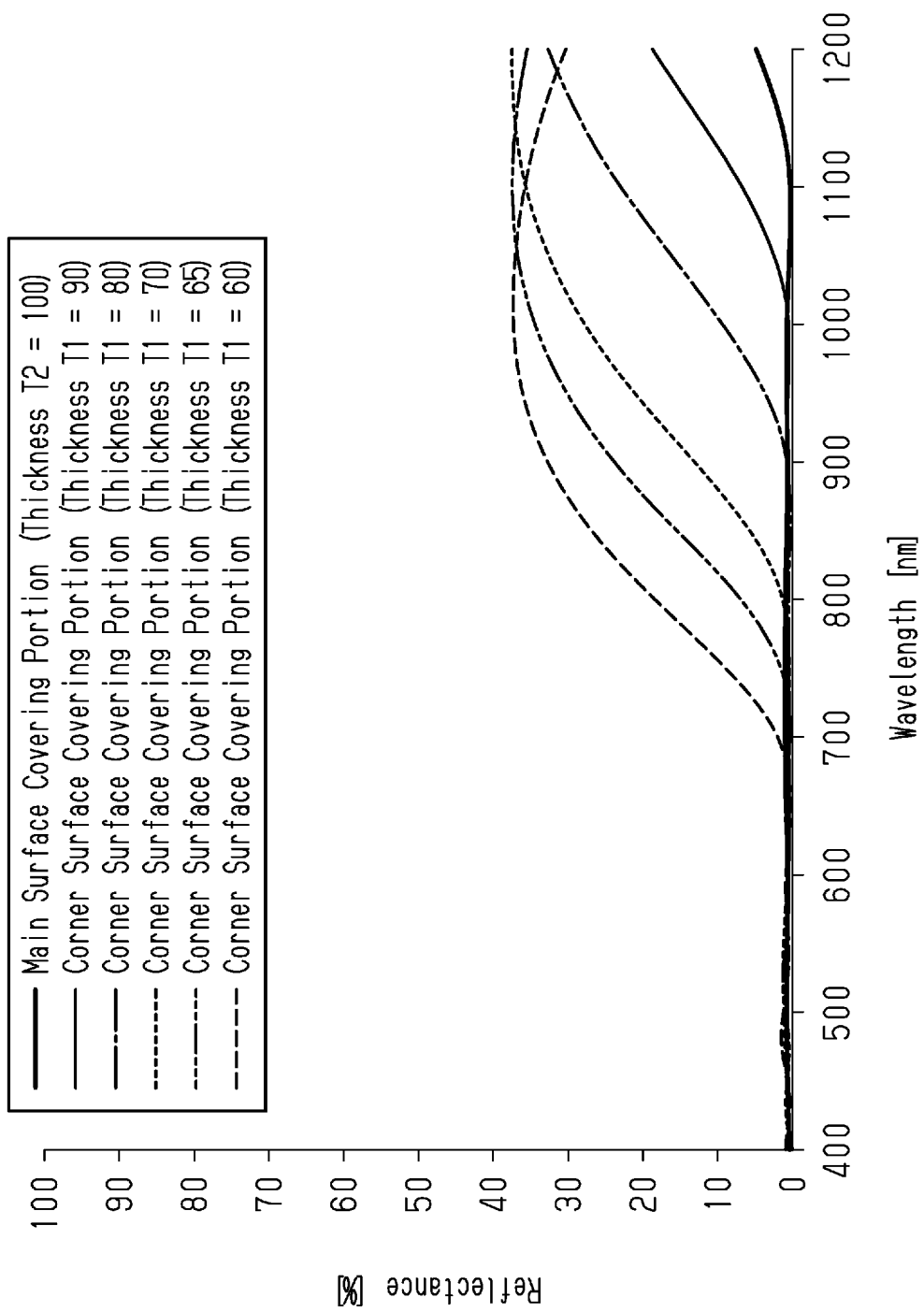
FIG. 4 is a graph showing the relationship of wavelength and reflectance of light emitted toward a dielectric multilayer film-incorporated glass plate of experimental example 2.

FIG. 4 is a graph showing the relationship of wavelength and reflectance of light emitted toward the dielectric multilayer film-incorporated glass plate 11 of experimental example 2. As shown in FIG. 4, even when the thickness T1 of the corner surface covering portion 13b is equal to a relative value of 60, the average reflectance of the corner surface covering portion 13b in the visible spectrum can be reduced.

The above embodiment has the advantages described below.

(1) The glass plate 12 in the dielectric multilayer film-incorporated glass plate 11 includes the corner surface 12c that is located between at least one main surface 12a and the side surface 12b. The dielectric multilayer film 13 of the dielectric multilayer film-incorporated glass plate 11 includes the main surface covering portion 13a that covers the main surface 12a of the glass plate 12 and the corner surface covering portion 13b that covers the corner surface 12c of the glass plate 12. With this structure, the corner surface covering portion 13b of the dielectric multilayer film 13 allows the dielectric multilayer film 13 to function sufficiently even at the corner surface 12c of the glass plate 12. Thus, the dielectric multilayer film 13 functions in a preferred manner when used with the glass plate 12 including the corner surface 12c. As a result, for example, at least one of the design of the glass plate 12 including the corner surface 12 and the function of the dielectric multilayer film 13 is offered.

(2) In the dielectric multilayer film-incorporated glass plate 11, it is preferred that the main surface covering portion 13a of the dielectric multilayer film 13 have an average reflectance of less than or equal to 2.0% in the visible spectrum at a wavelength greater than or equal to 400 nm and less than or equal to 780 nm. Further, it is preferred that when the average reflectance of the main surface covering portion 13a in the above visible spectrum corresponds to a relative value of 100, the corner surface covering portion 13b of the dielectric multilayer film 13 have an average reflectance of less than or equal to a relative value of 1500 in the above visible spectrum.

In this case, the dielectric multilayer film-incorporated glass plate 11 reduces reflection of visible light in a preferred manner at the main surface covering portion 13a and the corner surface covering portion 13b of the dielectric multilayer film 13.

Further, the dielectric multilayer film-incorporated glass plate 11 used as a cover member for a monitor avoids a situation in which the corner surface covering portion 13b appears to be colored differently from the main surface covering portion 13a due to the reflection of light at the corner surface covering portion 13b. The main surface covering portion 13a and the corner surface covering portion 13b have the same color and thereby provide a cover member having superior design.

(3) In the dielectric multilayer film-incorporated glass plate 11, it is preferred that the main surface covering portion 13a of the dielectric multilayer film 13 have an average reflectance of greater than or equal to 70% in the infrared spectrum at a wavelength greater than or equal to 950 nm and less than or equal to 1100 nm.

In this case, the dielectric multilayer film-incorporated glass plate 11 increases the reflection of infrared light in a preferred manner at the main surface covering portion 13a and the corner surface covering portion 13b of the dielectric multilayer film 13.

When the dielectric multilayer film-incorporated glass plate 11 is used as a cover member for a monitor, the monitor may be damaged by heat. However, the increased reflection of infrared light prevents damage to the monitor that would be caused by heat.

(4) In the dielectric multilayer film-incorporated glass plate 11, it is preferred that the main surface covering portion 13a and the corner surface covering portion 13b of the dielectric multilayer film 13 be formed continuously and homogeneously by a plurality of layers. Further, it is preferred that when the thickness T2 of the main surface covering portion 13a corresponds to a relative value of 100, the thickness T1 of the corner surface covering portion 13b of the dielectric multilayer film 13 be greater than or equal to a relative value of 50 and less than equal to a relative value of 95.

When the thickness T1 of the corner surface covering portion 13b is less than the thickness T2 of the main surface covering portion 13a of the dielectric multilayer film 13, delamination of the corner surface covering portion 13b from the corner surface 12c of the glass plate 12 is limited. However, optical characteristics may differ greatly between the main surface covering portion 13a and the corner surface covering portion 13b. The above structure limits delamination of the corner surface covering portion 13b and brings the optical characteristics of the corner surface covering portion 13b closer to those of the main surface covering portion 13a. Thus, for example, when the dielectric multilayer film 13 functions to reduce the reflection of visible light, the reflectance of the main surface covering portion 13a is close to the reflectance of the corner surface covering portion 13b. This avoids a situation in which the main surface covering portion 13a and the corner surface covering portion 13b are visually recognized to have different color tones.

(5) When the dielectric multilayer film-incorporated glass plate 11 is used as a cover member coupled in a state in which at least part of the corner surface covering portion 13b of the dielectric multilayer film 13 is exposed, the dielectric multilayer film-incorporated glass plate 11 serves as an article in which the dielectric multilayer film functions sufficiently even at, for example, the corner surface 12c of the glass plate 12.

MODIFIED EXAMPLES

The above embodiment may be modified as described below.

In the dielectric multilayer film-incorporated glass plate 11, the dielectric multilayer film may be arranged on a main surface at a side opposite to the main surface 12a of the glass plate 12 or the side surface 12b of the glass plate 12.

In the dielectric multilayer film-incorporated glass plate 11, the main surface covering portion 13a and the corner surface covering portion 13b of the dielectric multilayer film 13 are formed continuously and homogeneously by a plurality of layers but may be formed heterogeneously by a plurality of layers. Further, the total number of laminated layers of the main surface covering portion 13a may differ from that of the corner surface covering portion 13b. Preferably, the main surface covering portion 13a and the corner surface covering portion 13b of the dielectric multilayer film 13 are formed continuously and homogeneously by a plurality of layers as described above in order to simplify manufacturing of the dielectric multilayer film-incorporated glass plate 11.

The dielectric multilayer film 13 of the dielectric multilayer film-incorporated glass plate 11 includes both the function for reducing the reflection of visible light and the function for increasing the reflection of infrared light but may include only at least one of these functions.

The dielectric multilayer film 13 of the dielectric multilayer film-incorporated glass plate 11 may include at least a function for increasing the reflection of ultraviolet light. Moreover, the dielectric multilayer film-incorporated glass plate 11 may further include an ultraviolet light shielding film. The ultraviolet light shielding film may be located at least on a main surface at the opposite side of the main surface 12a of the glass plate 12, between the glass plate 12 and the dielectric multilayer film 13, or on the dielectric multilayer film 13.

DESCRIPTION OF REFERENCE CHARACTERS 11) dielectric multilayer film-incorporated glass plate, 12) glass plate, 12a) main surface, 12b) side surface, 12c) corner surface, 13) dielectric multilayer film, 13a) main surface covering portion, 13b) corner surface covering portion, T1) thickness (corner surface covering portion), T2) thickness (main surface covering portion)

The invention claimed is:

1. A dielectric multilayer film-incorporated glass plate comprising:
    a glass plate; and
    a dielectric multilayer film, wherein
    the glass plate includes a corner surface located between at least one main surface and a side surface, and
    the dielectric multilayer film includes a main surface covering portion that covers the main surface of the glass plate and a corner surface covering portion that covers the corner surface of the glass plate,
    wherein the main surface covering portion and the corner surface covering portion of the dielectric multilayer film are formed continuously and homogeneously by a plurality of layers, and
    when the main surface covering portion has a thickness corresponding to a relative value of 100, the corner surface covering portion has a thickness of greater than or equal to a relative value of 50 and less than or equal to a relative value of 95.

2. The dielectric multilayer film-incorporated glass plate according to claim 1, wherein
    the main surface covering portion has an average reflectance of less than or equal to 2.0% in a visible spectrum at a wavelength greater than or equal to 400 nm and less than or equal to 780 nm, and
    when the average reflectance of the main surface covering portion in the visible spectrum corresponds to a relative value of 100, the corner surface covering portion has an average reflectance of less than or equal to a relative value of 1500 in the visible spectrum.

3. The dielectric multilayer film-incorporated glass plate according to claim 1, wherein the main surface covering portion has an average reflectance of greater than or equal to 70% in an infrared spectrum at a wavelength greater than or equal to 950 nm and less than or equal to 1100 nm.

4. The dielectric multilayer film-incorporated glass plate according to claim 1 that is used as a cover member coupled in a state in which at least part of the corner surface covering portion is exposed.

5. A method for manufacturing the dielectric multilayer film-incorporated glass plate according to claim 1, the method comprising:
   obtaining the glass plate by forming the corner surface on a glass sheet; and
   arranging the dielectric multilayer film on the main surface of the glass plate and the corner surface of the glass plate.

* * * * *